G. W. WRIGHT AND T. J. PENSION.
LOCKING DEVICE FOR AUTOMOBILES.
APPLICATION FILED DEC. 13, 1921.

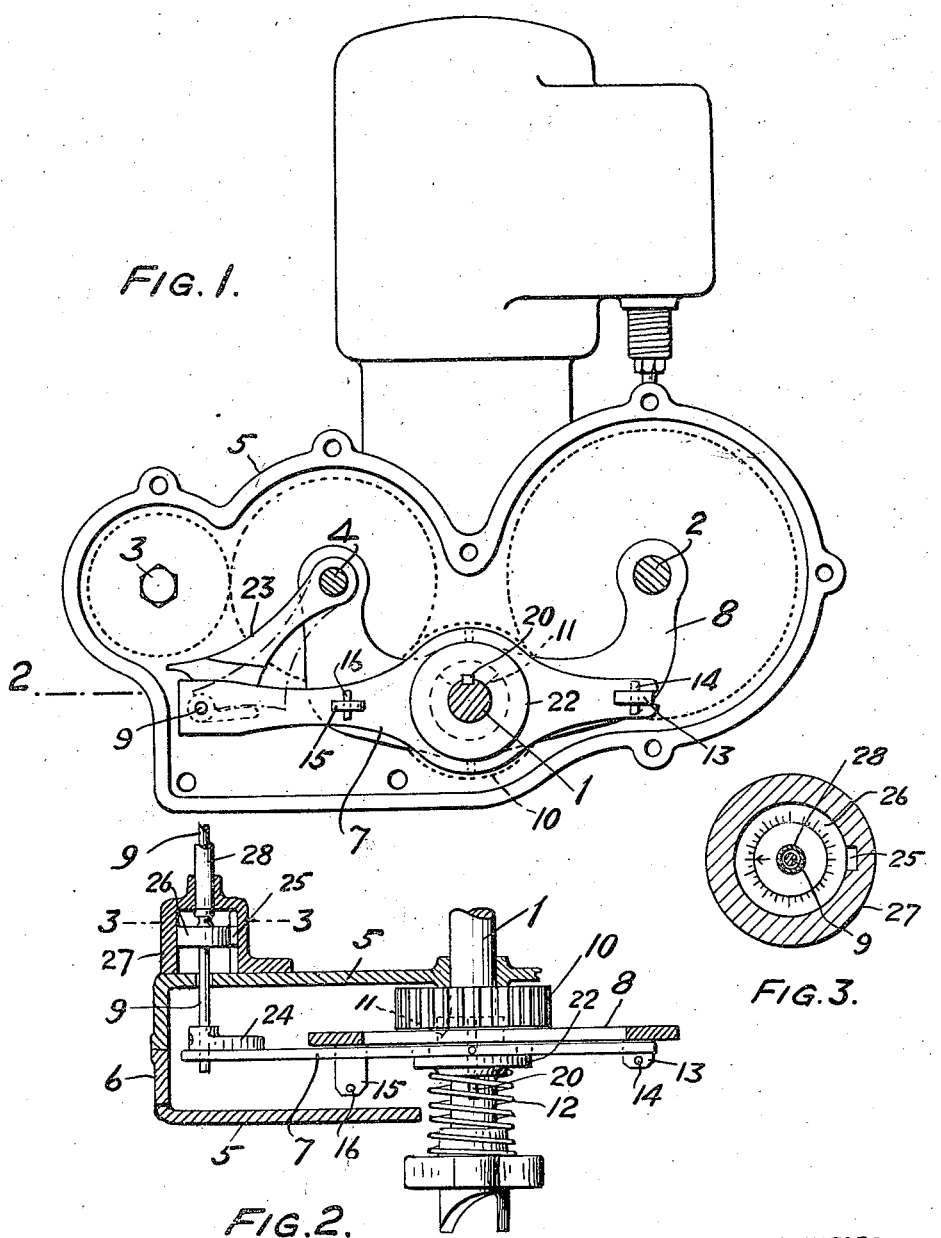

1,429,181.

Patented Sept. 12, 1922.
2 SHEETS—SHEET 2.

WITNESS:
Rob R Kitchel.

INVENTORS
George W. Wright &
Thomas J. Pension
BY
Augustus B. Stoughton.
ATTORNEY.

Patented Sept. 12, 1922.

1,429,181

UNITED STATES PATENT OFFICE.

GEORGE W. WRIGHT AND THOMAS J. PENSION, OF PHILADELPHIA, PENNSYLVANIA, ASSIGNORS OF THREE-EIGHTHS TO SAID WRIGHT, THREE-EIGHTHS TO SAID THOMAS J. PENSION, AND ONE-FOURTH TO THOMAS M. PENSION, OF PHILADELPHIA, PENNSYLVANIA.

LOCKING DEVICE FOR AUTOMOBILES.

Application filed December 13, 1921. Serial No. 521,967.

*To all whom it may concern:*

Be it known that we, GEORGE W. WRIGHT and THOMAS J. PENSION, citizens of the United States, residing at Philadelphia, in the county of Philadelphia and State of Pennsylvania, have jointly invented a new and useful Improvement in Locking Devices for Automobiles, of which the following is a specification.

The invention relates to improvements in locking devices for automobiles which operate by connecting and disconnecting the crank shaft and one or more of the engine control shafts, such as the cam shaft, and by locking such shaft or shafts in disconnected relation thereby making the engine inoperative and preventing unauthorized use or theft of the car or vehicle while leaving it free to be towed or pushed about a garage or in case of fire.

The principal objects of the present invention are, first, to provide for the application of mechanism embodying features of the invention to existing cars without substantial alteration and with a minimum of cost and expense; second, to provide simple, compact, safe and efficient mechanism for connecting and disconnecting the shafts and gears and for securely locking the same in disconnected relation; third, to provide for operating the connecting and disconnecting and locking mechanism from the seat or passenger space of the car; and fourth, to provide a satisfactory, simple, reliable and easily made and installed and operated mechanism of the type referred to.

The invention will be claimed at the end hereof but, generally stated, it comprises the combination of the engine control and crank shafts, a gear case enclosing the same, a key shifting lever plate disposed transversely of the automobile and supported by said shafts and arranged in the case, a rod ranging lengthwise of the automobile for operating said lever plate, a master gear loosely mounted on one of said shafts, a spring pressed key operated by said lever plate for connecting and disconnecting the gear and the shaft on which it is mounted, and locking means. The invention further comprises the improvements to be presently described and finally claimed.

In the following description reference will be made to the accompanying drawings illustrating features of the invention and forming part hereof and in which Figure 1 is a front view with the gear case cover removed showing the shafts in section indicating the gears by dotted lines and illustrating mechanism embodying features of the invention.

Fig. 2 is a section, taken generally on the line 2 of Figure 1, with parts omitted for the sake of clearness.

Fig. 3 is an enlarged sectional view on the line 3—3 of Fig. 2.

Figure 4:
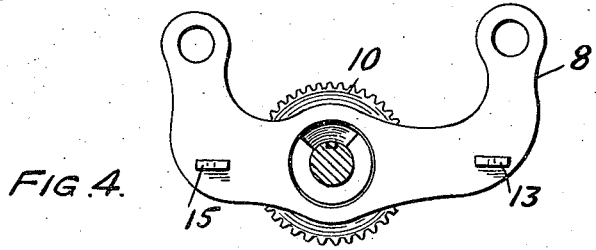
Figs. 4 and 5 are detached views of parts shown in Figure 1.
Figure 5:
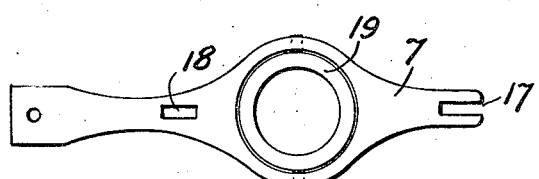
Figure 6:
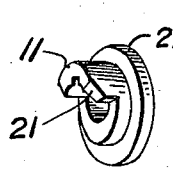
Figs. 6, 7 and 8 are a perspective, sectional and front view of the key mechanism shown in Figure 1.
Figure 7:
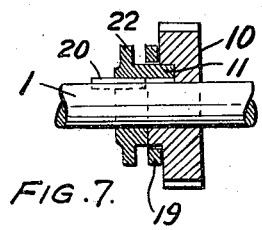
Figure 8:
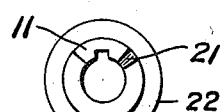
Figure 9:
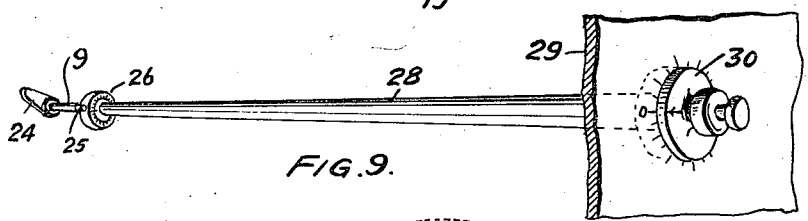
Fig. 9 is a detached view showing the operating rod mechanism of which a part is shown in Fig. 2.

In the drawings the engine control and crank shafts are marked as follows: 1 is the crank shaft, 2 is the cam shaft, 3 is the ignition shaft, and 4 is an idler shaft. 5 is a gear case and it is a usual provision of an automobile except that in the present instance it is somewhat enlarged by the insertion of a liner or frame 6. 7 is a key shifting lever plate disposed transversely of the automobile and supported by the shafts and arranged in the case. As shown in Figs. 1-4 this lever plate is supported by a yoke 8 applied to and carried by the shafts 2 and 4. 9 is a rod ranging lengthwise of the automobile for operating the lever plate 7. One of the gears is loosely mounted on one of the shafts and it may be referred to as a master gear. As shown in Figs. 1-8, the master gear 10 is loosely mounted for rotation on the crank shaft 1. 11 is a key spring pressed by a spring 12 and operated by the lever plate 7 for connecting and disconnecting the gear 10 with and from the shaft 1 on which it is mounted. The lever plate 7 is pivoted to a projection 13 on the yoke 8 by a pin 14 and is guided by a similar pin and projection 15 and 16. The projection 13 is accommodated by a fork 17, and the projection 15 is accommodated by a slot 18. The lever 7 is fitted with a gimbal ring 19 and as shown in Fig. 1 the lefthand end of the lever is movable in the direction of toward and away from the paper. The key 11 is arranged for endwise movement on the shaft but it turns with the shaft being secured thereto by a spline 20, and in the embodiment under consideration the spline 20 may occupy a prolongation of the keyway which is usually provided in the shaft 1 and used for keying the gear 10 to the shaft but, as has been said, the gear 10 is not keyed to the shaft but is released therefrom and is provided in its hub portion with a cavity for the reception of the key 11, the end of which may be beveled as at 21 to facilitate the entry of the key into the cavity. The gimbal ring 19 is arranged between the face of the gear 10 and the collar 22 on the key. The spring 12 also operates on the collar 22. Evidently when the lever plate 7 is moved out of the plane of the paper the key 11 is withdrawn from the gear 10 so that the latter is loose on the shaft 1 and in that position of the parts the engine is inoperative. Movement of the lever plate 7 in the other direction locks the key 11 to the wheel 10, and the key being compelled to rotate with the shaft 1 by the spline 20, the wheel 10 and shaft 1 turn together and the engine is operative. Endwise movement of the rod 9 shifts the lever plate 7, and when shifted to withdraw the key, the latch 23 pivoted to the shaft 4, Fig. 1, falls down behind the plate and so keeps the plate in forward position with the engine out of commission and the latch keeps the plate in that position so that it cannot be pulled back by the rod 9 or in any available way. To get the plate back, the finger 24 on the end of the rod 9 is turned by turning the rod 9, and the finger 24 lifts up the latch 23 and so permits the plate 7 to be retracted by the rod. The rod 9 is locked against turning movement by the bolt 25 of the lock 26 on the rod 9, which lock is shown as a combination lock arranged in a suitable housing 27 and operated by a sleeve 28 that extends to some convenient point, for example, through the dash board 29 and is there provided with an index and dial 30.

In use the engine may be thrown out of operation by simply pushing the rod 9 forward, thus shifting the lever plate 7 throwing out the key 11 and letting the latch 23 fall into position for locking the parts in the described positions. The bolt of the lock 26 normally engages the housing 27 so that while the rod 9 may move back and forth it cannot be turned. Those skilled in the art will understand that since all the parts are enclosed in the gear case or other housing and since the various parts of the car prevent access to the gear case that the locking mechanism described is well protected against unauthorized tampering with. In fact the car would have to be taken apart to release the mechanism if it were not for the ability to unfasten the lock 26 and in that way permit the rod 9 to be turned so that the latch 23 can be lifted and the spring 12 permitted to return the parts to the position in which the engine is operative.

Figures 10, 11:
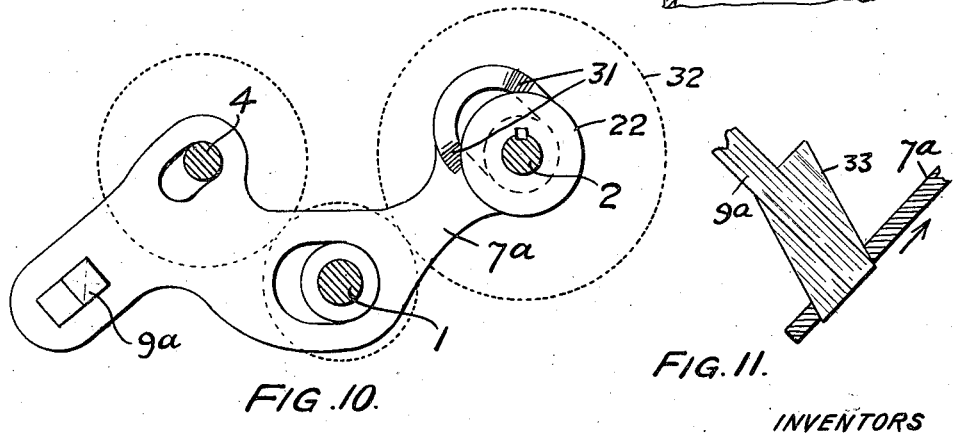
Fig. 10 is a front view illustrating a modification.
Fig. 11 is a side view, partly in section, illustrating a detail of the operating means shown in Fig. 10.

The construction and mode of operation of the modification shown in Figs. 10 and 11 are substantially as has been described except that the lever plate 7ª, while supported on the shafts 4 and 1, has a combined sliding and turning movement which causes the cam face 31 to operate on the collar 22 of the key and so disconnect the gear 32 and permit it to re-connect with the cam shaft 2. In this case the rod 9ª is fitted with a cam 33 that shifts the plate 7ª, and the rod 9ª is locked against endwise instead of turning motion in substantially the manner above described, that is, by a lock like the lock 26 but having its bolt arranged to project into a keeper in which the bolt is not sidewise movable as is the case in Fig. 2.

Evidently mechanism embodying the invention is very compact and can be accommodated in the space at the front of the gear case by the slight elongation of that case by means of the part 6, and the mechanism is applied to the car without disturbing or very slightly disturbing or altering any of its parts and by reason of its construction and location the mechanism is protected against tampering with and yet is easily operated from the driver's seat.

Obviously modifications may be made in details of construction and arrangement without departing from the spirit of the invention which is not limited as to those matters or otherwise than as the prior art and the appended claims may require.

We claim:

1. In a locking device for automobiles the combination of engine control shafts, a gear case enclosing the same, a key shifting lever plate disposed transversely of the automobile and supported by said shafts and arranged in the case, a rod ranging lengthwise of the automobile for operating said lever plate, a master gear loosely mounted on one of said shafts, a spring pressed key operated by the lever plate for connecting and disconnecting the gear and the shaft on which it is mounted, and a lock for said rod, substantially as described.

2. In a locking device for automobiles the combination of engine control shafts, a yoke adapted for application to the shafts, a key shifting lever plate pivoted to the yoke, a gravity latch pivotal in respect to the yoke and adapted to fall past said lever, a rod for actuating the lever plate and provided with a finger for lifting the latch, a master gear loosely mounted on one of the shafts, a spring pressed key operated by the lever plate, and means for locking the rod against rotation.

3. In a locking device for automobiles the combination of engine control shafts, a yoke adapted for application to the shafts, a key shifting lever plate pivoted to the yoke, a gravity latch pivotal in respect to the yoke and adapted to fall past said lever, a rod for actuating the lever plate and provided with a finger for lifting the latch, a master gear loosely mounted on one of the shafts, a spring pressed key operated by the lever plate, a gimbal ring between the lever plate and key, and means for locking the rod against rotation.

4. In a locking device for automobiles the combination of engine control shafts, a yoke adapted for application to the shafts, a key shifting lever plate pivoted to the yoke, a gravity latch pivotal in respect to the yoke and adapted to fall past said lever, a rod for actuating the lever plate and provided with a finger for lifting the latch, a master gear loosely mounted on one of the shafts, a spring pressed key operated by the lever plate, and means for locking the rod against rotation comprising a lock and its complemental sleeve operatable from the interior of the car.

GEORGE W. WRIGHT.
THOMAS J. PENSION.